Patented May 15, 1923.

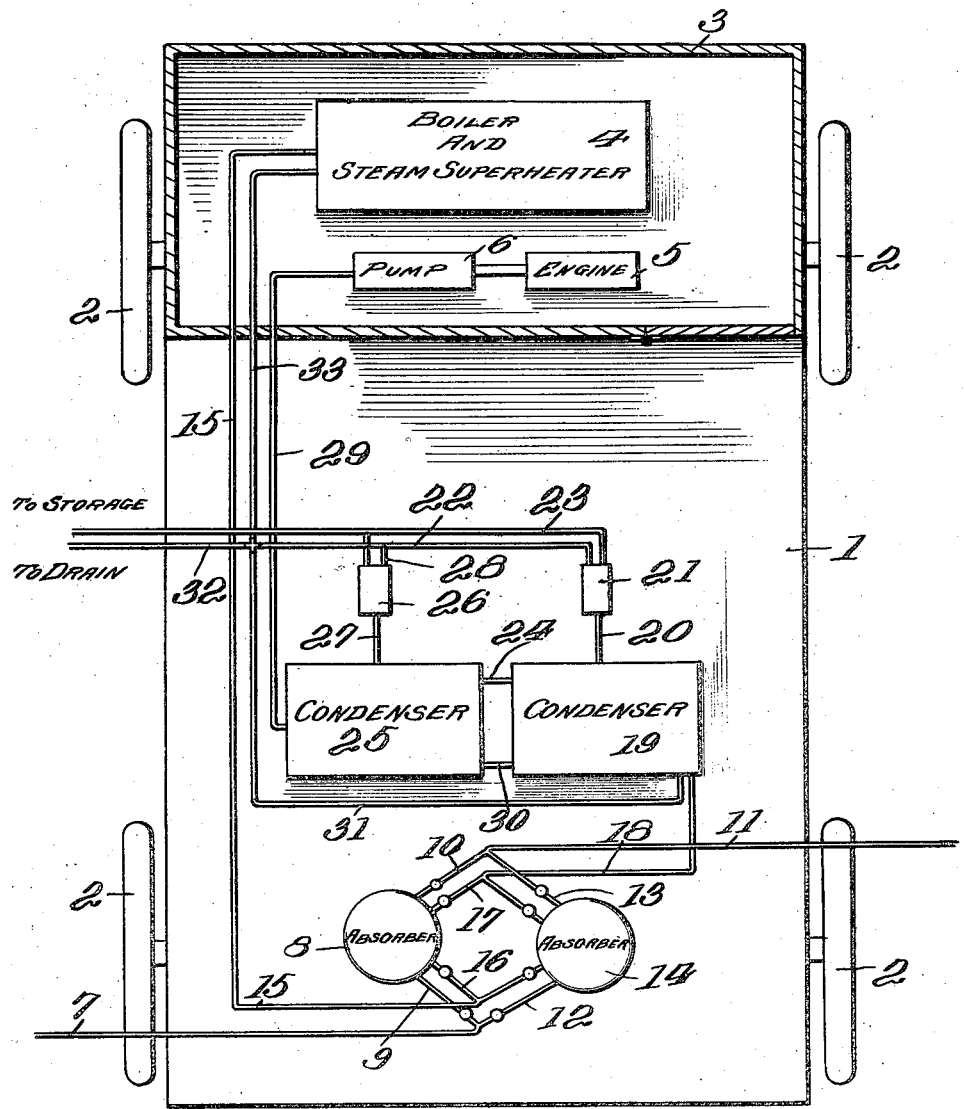

1,455,407

UNITED STATES PATENT OFFICE.

GEORGE G. OBERFELL, OF TULSA, OKLAHOMA, AND GEORGE A. BURRELL, OF NEW YORK, N. Y., ASSIGNORS TO GASOLINE RECOVERY CORPORATION, A CORPORATION OF DELAWARE.

PORTABLE APPARATUS FOR THE EXTRACTION OF VAPORS FROM GASES.

Application filed August 2, 1920. Serial No. 400,592.

*To all whom it may concern:*

Be it known that we, GEORGE G. OBERFELL and GEORGE A. BURRELL, citizens of the United States, residing at Tulsa, in the county of Tulsa and State of Oklahoma, and at New York, county of New York, and State of New York, respectively, have invented certain new and useful Improvements in Portable Apparatus for the Extraction of Vapors from Gases; and we do hereby declare the following to be a full, clear, and exact description of the invention, such as will enable others skilled in the art to which it appertains to make and use the same.

The processes used in the extraction of gasoline from natural gas depends upon principles of compression, refrigeration and absorption in liquid absorbing media (see Bureau of Mines bulletins Nos. 151 and 176 by W. P. Dykema). In the compression process the gas is compressed to pressures ranging from 50 to 300 pounds per square inch, and then cooled, part of the gasoline being thereby condensed and recovered from the gas. This process is not applicable by present plant practice to gas having a gasoline content much less than 1.5 gals. per M cu. ft. of gas, since the percentage efficiency of gasoline extraction is dependent, in present compression plant practice upon the gasoline content of the gas. In the absorption process the gas is brought into intimate contact with a liquid that absorbs the gasoline vapors from the gas. The gasoline is then separated from the absorbing medium by a distillation process. If naphtha is used as the absorbing medium this separation is not necessary. The absorption process is applicable to natural gas of either high or low gasoline content, and may be carried out with gas at either high or low pressures, but the cost of installation and operation of an absorption gasoline plant will be greater at the lower pressure.

The amount of gas necessary to make a profitable proposition for the extraction of gasoline is dependent upon the gas pressure and upon the quality of gas available for treatment. Owing to the high costs of gathering lines, equipment, erection and operation of compression plants, this process has not been used as a general practice in treatment of gas in quantities much less than about 50,000 cu. ft. of gas daily or stated in terms of plant production with a production of much less than 150 gallons of gasoline daily. It is true that there are gasoline plants operating on as low a quantity of gas as 5,000 cu. ft. daily and producing only 50 gallons of gasoline daily, (H. P. Westcott—Handbook of Casinghead gas P. 235), but the process has not met with general practice for reasons stated above. For the same reasons the absorption process has not met with general practice with gas in quantities much less than about 50,000 cu. ft. daily or with a production of much less than 150 gallons of gasoline daily. The life of gas wells and oil wells as far as supply of gas is concerned, is also a factor which must be considered in estimating profits of any proposition for the extraction of gasoline, owing to the cost of moving the location of the gasoline plant to a new location or source of gas supply. It is also a fact that in both the compression and absorption processes that not all of the gasoline vapors are removed from the gas. The object of this invention is to effect a more complete removal of the gasoline vapors from the gas and to make possible the profitable treatment of gas which has not been heretofore treated for reasons already given. This invention is therefore one which pertains to the conservation of one of our natural resources. The method depends upon the use of a solid absorbing medium such as charcoal or silica gel, and is applicable to gas at either high or low pressure and to gas of either high or low gasoline content.

Charcoal made from cocoanut shells, or other nut shells, peach pits, hard coal, wood, etc., and which is made from such substances by first heating at about 1000° C. for about 12 hours with subsequent cooling and reheating with air steam, carbon dioxide or other suitable oxidizing agent is particularly adapted for this purpose as by these means there is produced charcoal of exceptional absorbing qualities. The property of absorbing the vapors at relative high temperature and reduced pressures is dependent upon the history of the charcoal as concerns its source and treatment during the process of manufacture. Any other method of producing ultra-miscroscopic capillaries or highly activated charcoal would give charcoal suitable for our purposes. Neither do we limit ourselves to highly activated charcoal but may use the solid absorbent, silica gel or a mixture of silica gel and charcoal or any other solid absorbent.

Owing to the more complete recovery and to a better separation of the very volatile hydrocarbons from the more stable or less volatile hydrocarbons, the gasoline produced from natural gas by this process is a more stable and a better product than that produced by other processes. Altho this invention is intended more especially for treatment of gas existing in small quantities (up to 200,000 cu. ft. daily) with a production of about 400 gallons of gasoline daily the process may also be used on large quantities of gas by (1) installing two or more units and (2) by using proportionally larger equipment. The entire equipment of a plant capable of treating a quantity of gas in excess of 200,000 cu. ft. daily may be so constructed as regards size and weight that it may be permanently installed on trucks or skids so that it may be moved from one location to another; (1) in case of depletion of gas supply. (2) for testing gas preliminary to installation of other gasoline plants. An arrangement of apparatus is effected whereby the operation of the plant is practically automatic.

The only attention required in operation of the plant is: Switching the feed of the gas, the heating medium and the cooling medium from one group of absorbers to another. (2) maintaining the desired temperature on the charcoal during the process of distillation. Any type boiler regulator will aid in this operation.

The accompanying drawing shows a diagrammatic view of an apparatus by means of which the process may be practiced. In this description reference is made to the use of charcoal as the solid absorbing medium.

The apparatus consists of a rectangular platform 1 mounted on wheels or skids 2, or other suitable means for transporting from place to place. On one end of this platform and covering about one third of the surface is erected an enclosed or partly enclosed building 3. Within this building is installed a combination boiler and superheater 4 of any ordinary or special design. A gas or steam engine 5 and water pump 6 suitable for furnishing power and water for cooling and boiler purposes is also arranged alongside the boiler.

On the uninclosed portion of the platform is mounted a plurality of condensers, separators, blenders, and absorbers also of special design constructed generally in accordance with the apparatus disclosed in the application of G. A. Burrell, George G. Oberfell and C. L. Vorees; filed June 18, 1920, Serial No. 389,954. The number of condensers, separators, and blenders will be determined by the rapidity with which the distillation process is to be carried out. The number of absorbers will be determined by two factors; (1) The amount of gas to be treated and (2) the method by which the cycle of absorptions is to be completed. It is possible to use only two absorbers alternating in each with the absorption and distillation. It is possible to use three absorbers following a cycle of absorbing, distilling, and cooling by passing the denuded gas through the hot charcoal. It is also possible to have several absorbers and use them successively for absorbing while the distillations are made only at stated periods. Thus we might have eight absorbers capable of absorbing from three hours gas flow each being saturated once each twenty four hours. We might then distill three at a time or all eight during a stated period each day.

In the following detailed description we will describe the system as having two condensers and two absorbers the absorbers to be used for absorbing and distilling alternately.

Natural gas from gas well or from oil wells or gas mixtures from any suitable source of supply which contain gasoline vapors enter the system through line 7 and pass to absorber 8 by way of line 9 where it passes either upward or downward through the charcoal. Vapors of commercial value are thereby removed from the gas. The absorption of vapors may be carried out with the gas at about atmospheric pressure or at pressures above or below atmospheric pressure and at atmospheric temperatures or at temperatures above or below atmospheric temperatures as long as temperatures do not get above 250 C. The charcoal which is in granular form is supported in the absorber by means of a screen or perforated plate. A perforated plate or screen of the movable type is also placed over the charcoal. After passing through the absorber 8, the gas denuded of the desired commercial vapors passes through the lines 10 and 11 to the disposal lines. When enough gas has been passed through absorber 8 to saturate the charcoal with the desired vapors to a pre-determined point, valves in lines 9 and 10, 12 and 13 are manipulated so as to pass gas through line 12, charcoal in absorber 14, and through line 13 to outlet.

While the absorption is taking place in absorber 14 steam or superheated steam is passed from the boiler and superheater 4 through the lines 15 and 16 into the absorber 8. The steam in passing through the charcoal tends to heat it and drive out again the vapors extracted from the gas. These vapors together with the steam and any condensed water is passed through the lines 17 and 18 into the condenser 19 where most of the steam and some of the commercial vapors are condensed. The condensed vapors from this condenser pass into the blender 21 through the pipe 20. The water and condensed commercial vapors are separated in this blender by gravity and the water passes to the drain by the pipe 22 while the condensed commercial vapors pass through the line 23 to storage.

Vapors not condensed in condenser 19 pass by 24 into condenser 25 where colder water is kept around the condenser coils. The condensed commercial vapors and water from condenser 25 pass into blender 26 by pipe 27 where they are separated by gravity. The water passes to the drain by pipes 28 and 22 while the condensed vapors pass by line 23 to storage.

When the distillation has been carried to a point where the majority of the absorbed vapors has been driven out the steam is then turned into another absorber.

Cooling medium for the operation of the system is supplied by pump 6 and carried to the condenser 25 by line 29. After passing around the coils in 25 it passes into condenser 19 by line 30 where it tends to reduce the temperature of the coils in 19. From 19 it passes through 31 either to the drain 32 or to the boiler by way of pipe 33.

Some of the advantages of this portable system as we have outlined it are:

1. It is readily transported from place to place as the gas supply diminishes or increases.

2. It is a system adaptable to treatment of very small volumes of gas.

3. It can be installed at relatively low cost figures.

4. The overhead costs are relatively low.

5. It is capable of being operated by one man.

6. It can be utilized in saving the gasoline from small groups of isolated wells where the value of the gas would not defray the expenses of piping to larger supplies of gas.

What we claim and desire to secure by Letters Patent is:

1. A portable apparatus for the extraction of vapors in commercial quantities from gases comprising a portable platform, an absorber unit permanently mounted on said platform containing activated charcoal and provided with means for admitting vapor containing gases to the same, and an outlet for the denuded gas, a condenser mounted on the platform and communicating with said unit for receiving vapors distilled from the same, and a boiler permanently mounted on the platform for furnishing steam to said absorber unit.

2. A portable apparatus for extracting vapors in commercial quantities from gases comprising a portable platform carrying permanently fixed absorbing units, condenser units, blending units, and a steam boiler, means for admitting gas to and discharging gas from the absorber units, fixed means connecting the absorber units with the condenser units for conveying vapors from the former to the latter, fixed means placing the blending units and condenser units in communication, means connecting the boiler and absorber units for conducting steam from the boiler to said absorber units, a motor driven water pump fixedly mounted on the platform, a pipe placing said pump in communication with one condenser unit, and a pipe connecting the other condenser unit to the boiler.

In testimony whereof we affix our signatures.

GEORGE G. OBERFELL.
GEORGE A. BURRELL.